United States Patent [19]
Roland

[11] Patent Number: 5,643,503
[45] Date of Patent: Jul. 1, 1997

[54] DEVICE FOR INTRODUCING A GAS INTO A LIQUID

[76] Inventor: Jean-Louis Roland, 95, avenue P. Grenier 92100, Boulogne, France

[21] Appl. No.: 620,378

[22] Filed: Mar. 22, 1996

[30] Foreign Application Priority Data

Apr. 3, 1995 [FR] France ................ 95 03892

[51] Int. Cl.⁶ .................................................. B01F 3/04
[52] U.S. Cl. ................. 261/30; 261/64.1; 261/93
[58] Field of Search ................ 261/87, 93, 30, 261/64.1

[56] References Cited

U.S. PATENT DOCUMENTS

| 2,343,274 | 3/1944 | Bailey, Jr. et al. | 261/93 |
| 2,348,990 | 5/1944 | McNeill | 261/93 |
| 2,743,914 | 5/1956 | Epprecht | 261/87 |
| 2,767,965 | 10/1956 | Daman | 261/87 |
| 2,944,802 | 7/1960 | Daman | 261/93 |
| 3,490,996 | 1/1970 | Kelly, Jr. | 261/93 |
| 3,984,001 | 10/1976 | Nagano et al. | 261/93 |
| 4,193,949 | 3/1980 | Naito et al. | 261/93 |
| 5,160,459 | 11/1992 | Guarnaschelli et al. | 261/87 |

FOREIGN PATENT DOCUMENTS

| 0 553 709 | 8/1993 | European Pat. Off. . |
| 2 293 235 | 7/1976 | France . |
| 828 100 | 7/1949 | Germany . |
| 25 44 204 | 4/1977 | Germany . |
| 25 59 234 | 7/1977 | Germany . |
| 25 59 236 | 7/1977 | Germany . |
| 2000039 | 1/1979 | United Kingdom . |

*Primary Examiner*—Tim R. Miles
*Attorney, Agent, or Firm*—Pollock, Vande Sande & Priddy

[57] ABSTRACT

Device for introducing a gas into a liquid, of the type which comprises a drive motor, a wind box, a gas intake pipe and a radial diffusion turbine coupled to an agitator turbine, the two turbines being immersed in the liquid mass and the gas being conveyed to the centre of the diffusion turbine and distributed between the vanes thereof, wherein the said diffusion turbine has a plurality of long radial vanes alternating with shorter radial vanes, the latter not extending as far as the shaft of the said turbine so as to leave a clear space between the said shaft and the respective internal edges of the said shorter radial vanes, these two sets of vanes being fixed under a plate driven in rotation by the said shaft and the said radial vanes of the diffusion turbine laterally extend the blades of the agitator turbine as far as a region of relative depression situated behind the turbine.

10 Claims, 2 Drawing Sheets

DEVICE FOR INTRODUCING A GAS INTO A LIQUID

The present invention relates to a device intended to introduce a gas deep within a static or moving liquid mass with a view to dissolving it in this liquid, this device being immersed in this liquid mass.

Such devices, which are generally in the form of immersed turbines driven by an electric motor and under the screw blades of which the end of a gas supply line emerges, are used particularly in methods for the biological purification of effluent or of waste water where they serve to effect an intense introduction of air or of oxygen into the raw effluent, this oxygen or this air ensuring direct oxidation of the effluent and allowing the aerobic bacteria to live and multiply. These same devices may also be applied to the degreasing and removal of oil as a pretreatment in stations for the purification of waste water, by introducing air into the mass of waste water, in the form of very fine dispersed bubbles, this air encouraging the grease and scum to collect at the surface.

Devices are already known which simultaneously allow gas to be diffused deep within the liquid mass to be aerated and agitation of this same liquid mass, it being possible for the intensity of this agitation to vary depending on the conditions of application and of use of such devices.

The known devices include a drive motor, a wind box, a gas intake pipe and a radial diffusion turbine which is coupled to an agitator turbine, these two turbines being immersed in the liquid mass and the gas, for example air which may or may not be pressurized, being conveyed to the centre of the diffusion turbine and distributed between the blades thereof.

With this state of the art as its starting point, the present invention sets out to make improvements, especially with the objective of improving the diffusion by creating conditions making it possible to obtain very fine gas bubbles with optimum performance of the diffusion and agitator turbines, at the same time avoiding any obstruction which may originate from the presence of solid particles in the liquid mass to be treated.

As a consequence, the subject of this invention is a device for introducing a gas into a liquid, of the type which comprises a drive motor, a wind box, a gas intake pipe and a radial diffusion turbine coupled to an agitator turbine, the two turbines being immersed in the liquid mass and the gas being conveyed to the centre of the diffusion turbine and distributed between the vanes thereof, this device being characterized in that the said diffusion turbine has a plurality of long radial vanes alternating with shorter radial vanes, the latter not extending as far as the shaft of the said turbine so as to leave a clear space between the said shaft and the respective internal edges of the said shorter radial vanes, these two sets of vanes being fixed under a plate driven in rotation by the said shaft and in that the said radial vanes of the diffusion turbine laterally extend the blades of the agitator turbine as far as a region of (relative) depression situated behind the turbine.

By virtue of the latter feature, the pressurized liquid is encouraged to expand and, as a consequence of this, the diffusion of microbubbles into the liquid mass is encouraged. This liquid mass is thus more homogeneous because it is taken from the upward stream generated by the blades of the agitator turbine which are extended by the vanes of the radial diffusion turbine.

According to a feature of this invention, discharge vanes are provided, making cleaning easier while eliminating the particles which become deposited behind the turbine, these discharge vanes being mounted above the plate which, on its lower face, accommodates the said vanes of the radial diffusion turbine.

According to the invention, the two turbines are mounted under a hydraulic plate on which the motor, the wind box and the gas intake pipe are mounted.

According to another feature of the device forming the subject-matter of the invention, a valve, especially a plug valve is provided, placed on the gas intake pipe in order to adjust the flow rate of gas let into the turbine.

Further features and advantages of the present invention will become clear from the description given hereinafter of one non-limiting embodiment, making reference to the attached drawings in which.

Figure 1:
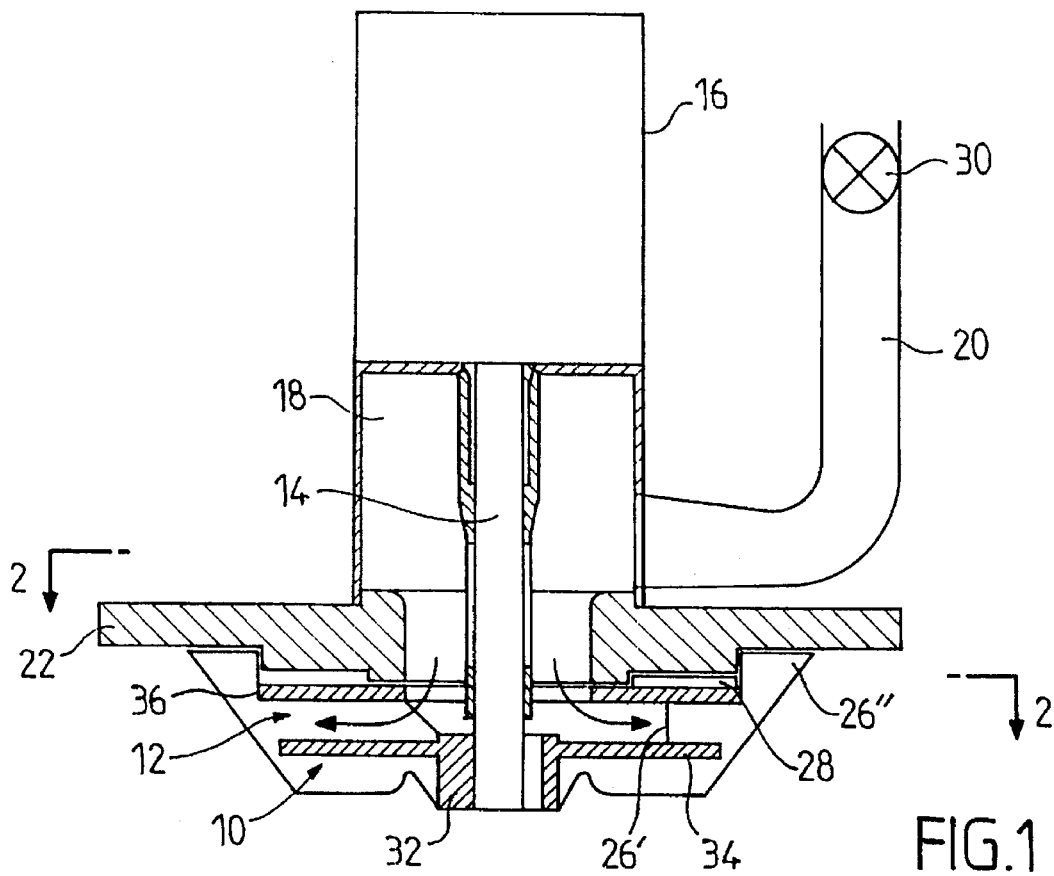
FIG. 1 is a diagrammatic view in section on 1—1 of FIG. 2, illustrating a preferred embodiment of the device forming the subject-matter of the invention.

Referring to the drawings, it may be seen that the device according to this invention is of the type which comprises a drive motor 16 mounted on a wind box 18 in which the end of a Gas intake pipe 20 emerges. This motor drives a set of turbines via its rotation shaft 14. This set includes a radial diffusion turbine 12 coupled to an agitator turbine 10. As may be seen more specifically in FIG. 1, the set of turbines 10–12 is held, by keys, on the end of the shaft 14 in a hub 32. The Gas, for example air which may or may not be pressurized, is conveyed to the centre of the diffusion turbine 12 between the vanes thereof as the arrows in FIG. 1 indicate. The set of turbines thus described is immersed deep within the liquid mass which is to be aerated and agitated.

Figure 3:
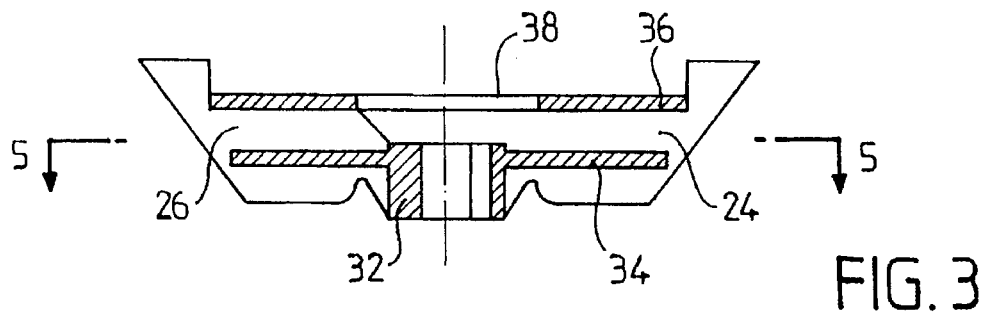
FIG. 3 is a part view representing just the two turbines coupled together, in section on 3—3 of FIG. 4.
Figure 4:
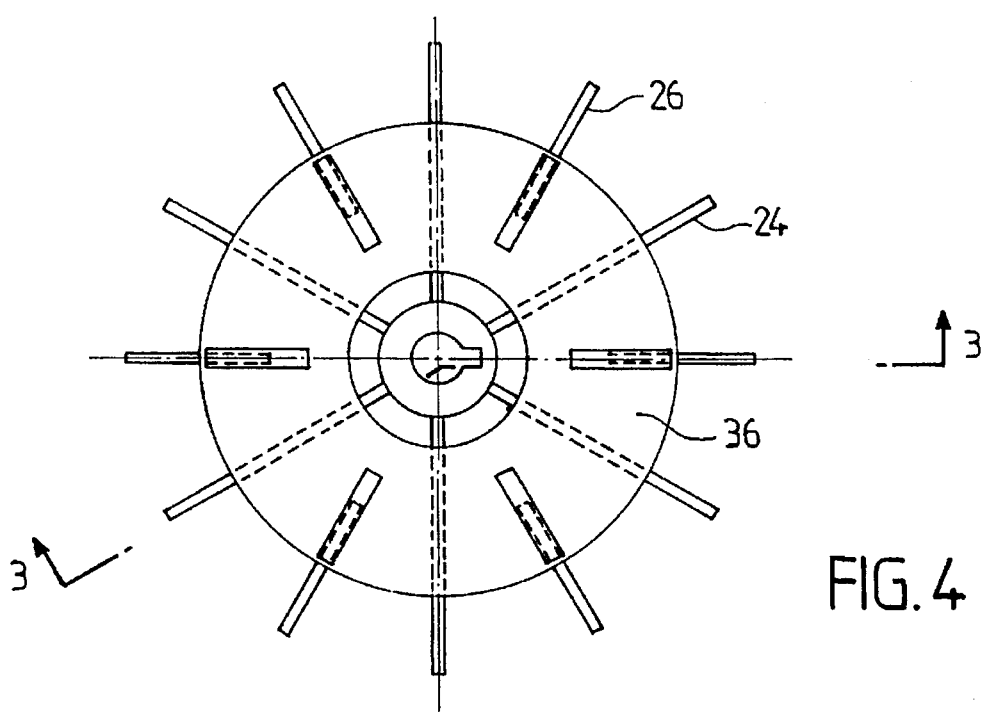
FIG. 4 is a plan view of FIG. 3.
Figure 5:
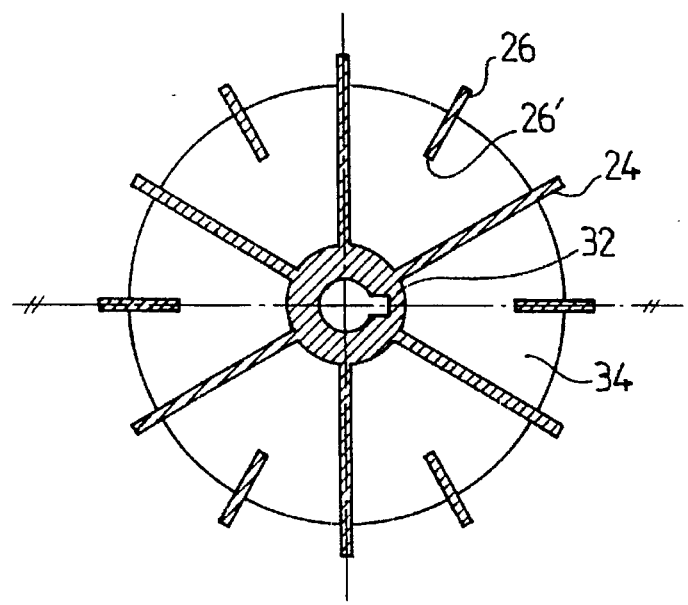
FIG. 5 is a view in section on 5—5 of FIG. 3.

According to the invention, the radial diffusion turbine 12 includes two types of vanes arranged uniformly under a plate 36 at the centre of which an opening 38 is made for letting in the gas conveyed through the pipe 20. These vanes are as follows:

a plurality of long radial vanes denoted by the reference 24, which extend from the hub 32 of the set of turbines as far as the periphery of this set, and a plurality of shorter radial vanes 26 which do not extend as far as the hub 32 as may be seen in FIGS. 3 and 4. These vanes 26 are alternated with the vanes 24.

By virtue of this arrangement which is a feature of the present invention, a clear space is left between the hub 32 of the turbine, and therefore the shaft 14 of the motor, and the internal edges 26' of the vanes 26. Moreover, experience has shown that choosing these two types of vanes makes it possible to obtain the formation of gas microbubbles at the end 26" of the vanes, and that this can be achieved on one vane in two, as a result of the expansion of the pressurized liquid at this point.

As clearly visible in FIGS. 1 and 3, the radial vanes 24 and 26 of the diffusion turbine 12 laterally extend the blades of the agitator turbine 10 as far as a region of (relative) depression situated behind the turbine. The blades of the agitator turbine 10 are fixed to a plate 34 in which the hub 32 accommodating the end of the drive shaft 14 is formed. In this way, each radial vane such as 24 or 26 and each blade of the agitator turbine 10 have a common edge. By virtue of this feature, the pressurized liquid is encouraged to expand and, as a consequence of this, the diffusion of the microbubbles deep within the liquid mass is encouraged.

This liquid mass is therefore more homogeneous because it is taken from the upward stream which is generated by the blades of the agitator turbine 10 which are extended by the vanes 24, 26 of the radial diffusion turbine 12.

The height of the blades of the agitator turbine 10 is chosen as a function of the desired intensity of agitation.

The set of turbines is mounted under a hydraulic plate 22 on which the wind box 18, the motor 16 and the gas intake pipe 20 are fixed.

Figure 2:
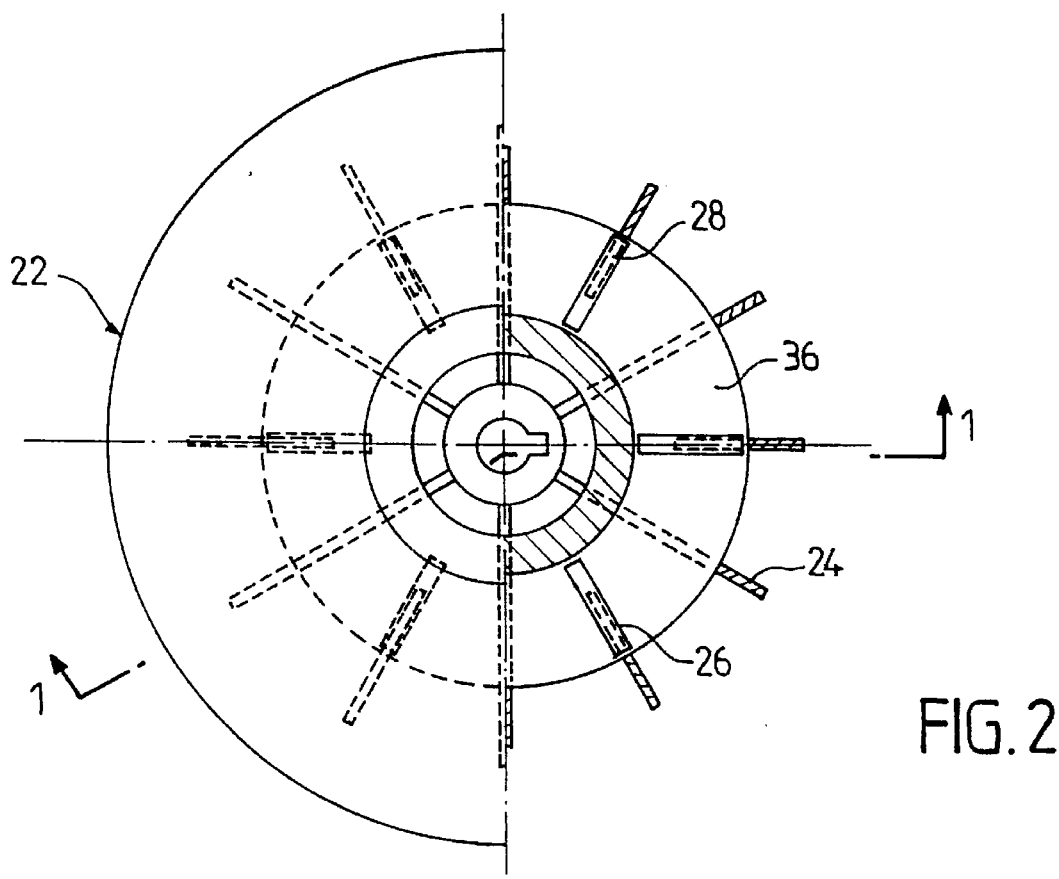
FIG. 2 is a view in section on 2—2 of FIG. 1.

According to the invention, and to make it easier to clean the turbines by eliminating the particles which are deposited behind them, discharge vanes such as 28 (FIG. 1 and 2) are provided, and these are mounted above the plate 36 on which, under its lower face, the two types of radial vanes 24, 26 of the diffusion turbine 12 are mounted.

It is known that effective solid-liquid separation and the concentration of the separated matter depend on the sufficient release of air bubbles with respect to the solid matter. When the device according to the invention is applied to solid-liquid separation, it is therefore of prior importance to keep the turbine at its point of optimum performance as a function of its degree of immersion so as to obtain this optimum release of air bubbles. According to the present invention, a valve, especially a plug valve 30, is provided for this purpose, placed on the gas intake pipe 30 so as to allow the volume of air let into the device to be adjusted, thus allowing empirical adjustment of the air/solid ratio, that is to say of the weight of air released (in kilos) per kilogram of matter in suspension.

It will be noted that the gas, for example air or oxygen, may be supplied via a compressor supplying the gas intake pipe 20, in the case where very high flow rates are required. It is emphasized that this feature gives a great degree of flexibility because it makes it possible for the compressor and the turbines to be used simultaneously during peak periods and for the turbines to be used on their own outside such periods.

It is understood from reading the foregoing description that the device forming the subject-matter of the invention makes it possible simultaneously to carry out oxygenation by diffusion of very fine air or oxygen bubbles through a liquid mass, and homogeneous agitation of this mass.

The device according to the invention may be applied to the degreasing and removal of oil from waste effluent. It is then immersed in the liquid mass so that the air released into this mass in the form of very fine bubbles dispersed deep within the liquid mass encourages the greases and scum to float on the surface; the device thus displays the advantage of, in addition, allowing agitation at a depth without agitating the surface which might disturb the film or layer of floating matter.

The device according to the invention may also be put to use in a plant for the biological treatment of water by activated slurries. It is immersed in the liquid mass and supplied preferably with air (or with oxygen) at an overpressure. It thus allows simultaneous oxygenation of the effluent allowing the aerobic bacteria to live and multiple by virtue of the formation of fine air (or oxygen) bubbles deep within the liquid mass, and agitation of this same liquid mass making it possible to keep the activated slurry in suspension and ensure that the mixture is homogeneous.

It remains clearly understood that the present invention is not limited to the embodiments and application mentioned hereinabove, but that it encompasses all variations thereof.

I claim:

1. Device for introducing a gas into a liquid, of the type which comprises a drive motor, a wind box, a gas intake pipe and a radial diffusion turbine coupled to an agitator turbine, the two turbines being immersed in the liquid mass and the gas being conveyed to the centre of the diffusion turbine and distributed between the vanes thereof, wherein the said diffusion turbine has a plurality of long radial vanes alternating with shorter radial vanes, the latter not extending as far as the shaft of the said turbine so as to leave a clear space between the said shaft and the respective internal edges of the said shorter radial vanes, these two sets of vanes being fixed under a plate driven in rotation by the said shaft and the said radial vanes of the diffusion turbine laterally extend the blades of the agitator turbine as far as a region of relative depression situated behind the turbine.

2. Device according to claim 1, wherein discharge vanes are provided, making cleaning easier while eliminating the particles which become deposited behind the turbine, these discharge vanes being mounted above the plate which, on its lower face, accomodates the said vanes of the radial diffusion turbine.

3. Device according to claim 1 wherein the two turbines are mounted under a hydraulic plate on which the drive motor, the wind box and the gas intake pipe are mounted.

4. Device according to claim 1, wherein the height of the blades of said agitator turbine is determined as a function of the desired intensity of agitation.

5. Device according to claim 1, wherein the gas is supplied via a compressor supplying the gas intake pipe.

6. Device according to claim 1 applied to the degreasing and removal of oil from waste effluent, said device being immersed in the liquid mass so that the air released into this mass in the form of very fine bubbles dispersed deep within the liquid mass encourages the grease and scum to collect on the surface.

7. Device according to claim 1, wherein a valve is placed on the gas intake pipe for adjusting the flow rate of gas let into the turbine.

8. Device according to claim 7, wherein said vale is a plug valve.

9. Device according to claim 1 applied to the biological treatment of water by activated slurries, said device being immersed in the liquid mass and supplied with air, in order simultaneously to ensure oxygenation of the effluent by the entrainment of air bubbles deep within the liquid mass and agitation of this liquid mass to keep the activated slurry in suspension and ensure that the mixture is homogeneous.

10. Device according to claim 9, wherein said air is supplied at an overpressure.

* * * * *